(12) United States Patent
Ploumis et al.

(10) Patent No.: US 9,517,372 B2
(45) Date of Patent: Dec. 13, 2016

(54) BENTONITE-FIBERGLASS FIRE BLANKET

(71) Applicant: Heat Shield, Inc, Eastchester, NY (US)

(72) Inventors: William Ploumis, Eastchester, NY (US); Eleni Ploumis, Eastchester, NY (US)

( * ) Notice: Subject to any disclaimer, the term of this patent is extended or adjusted under 35 U.S.C. 154(b) by 122 days.

(21) Appl. No.: 14/542,536

(22) Filed: Nov. 14, 2014

(65) Prior Publication Data
US 2015/0136431 A1    May 21, 2015

Related U.S. Application Data

(60) Provisional application No. 61/905,305, filed on Nov. 18, 2013.

(51) Int. Cl.
*A62C 8/06* (2006.01)
*B32B 5/26* (2006.01)
*B32B 5/02* (2006.01)

(52) U.S. Cl.
CPC .............. *A62C 8/06* (2013.01); *B32B 5/024* (2013.01); *B32B 5/028* (2013.01); *B32B 5/26* (2013.01); *B32B 2255/02* (2013.01); *B32B 2255/20* (2013.01); *B32B 2262/101* (2013.01); *B32B 2307/3065* (2013.01); *B32B 2571/00* (2013.01)

(58) Field of Classification Search
CPC ............. A62C 8/06; B32B 5/26; B32B 5/028; B32B 2255/02; B32B 2255/20; B32B 2262/101; B32B 2307/3065; B32B 5/024; B32B 2571/00
See application file for complete search history.

(56) References Cited

U.S. PATENT DOCUMENTS

| 3,593,409 A | 7/1971 | Silverstein |
| 6,004,387 A | 12/1999 | Ishikawa |
| 6,921,431 B2 | 7/2005 | Evans et al. |
| 7,409,798 B2 | 8/2008 | Freeby et al. |
| 8,187,423 B1 * | 5/2012 | Glenn ................... B29C 70/443 162/141 |
| 2008/0166937 A1 | 7/2008 | Garvey |
| 2011/0281981 A1 | 11/2011 | Bateman et al. |
| 2012/0097405 A1 * | 4/2012 | Cordts .................... A62C 2/06 169/45 |
| 2012/0128959 A1 | 5/2012 | Fernando et al. |
| 2012/0156405 A1 | 6/2012 | Lee |
| 2012/0315457 A1 | 12/2012 | Zheng et al. |

* cited by examiner

*Primary Examiner* — Christopher Kim
(74) *Attorney, Agent, or Firm* — Vance Intellectual Property, PC

(57) ABSTRACT

The invention provides a novel bentonite-fiberglass fire blanket, comprising: bentonite and fiberglass and an optional mesh fabric, such as cheesecloth.

13 Claims, No Drawings

BENTONITE-FIBERGLASS FIRE BLANKET

FIELD OF THE INVENTION

The present invention generally relates to a bentonite-fiberglass fire blanket, methods of using the same, and methods for making the same.

BACKGROUND OF THE INVENTION

Fire blankets have been in use for many years and are typically made of chemically treated wool or fiberglass. These blankets are most often found in commercial kitchens and can be used to help put out a fire (e.g., a kitchen grease fire) as well as to protect a person entrapped in a fire. Fire blankets come in a wide range of sizes, e.g., from about 3' square for small kitchen fires to 5'×7' for larger fires or personal protection.

Another type of fire blanket is the conventional soldering blanket. This blanket is a cloth, usually dry, averaging less than 12"-16" square and is designed to afford protection from flame damage during fabrication and repair procedures. Current designs require grommets or staples for positioning, are cumbersome (~½" thick), and cannot be subjected to a sustained direct, continuous flame. Previously soldered joints, heat sensitive valves, etc. are typically not protected and the soldering space is often times damaged.

Fire blankets can also be used for fire shelters. There shelters are designed as a last resort to protect firefighters, usually fighting wildfires. Fire blankets in this setting are typically thin sheets of reflective material. The reflective sheets are much lighter than commercial fire blankets, but suffer from their inability to protect a firefighter from extreme heat or flame contact.

Fiberglass like other ceramic material is non-flammable, does not absorb moisture and is non-microbial. Alone, fiberglass has the ability to withstand 2000° F. of direct flame penetration; above this, the glass fibers begin softening, holes start to form, and the material degrades. Thus, fiberglass itself is not a particularly effective as a fire blanket, particularly as a solder blanket or as a fire shelter. Attempts have been made to enhance the flame retardant qualities of fiberglass. For example, US Patent Publication 2012/03115457 describes a fiberglass-vermiculite thermal insulation.

With fire blankets having so many applications, it would be beneficial to develop a blanket that can withstand high temperatures, is easy to use in small locations, and could reflect enough heat to protect firefighters who are caught in harm's way.

SUMMARY OF THE INVENTION

In an aspect, the present invention provides a novel bentonite-fiberglass fire blanket.

In another aspect, the present invention provides a novel method of making a bentonite-fiberglass fire blanket.

These and other objects, which will become apparent during the following detailed description, have been achieved by the inventors' discovery that the combination of bentonite clay with fiberglass provides a blanket that is highly resistant to breakdown even under direct flame.

DETAILED DESCRIPTION OF THE INVENTION

It has now been discovered that introducing bentonite into the interstitial spaces in woven fiberglass yields a bentonite-fiberglass blanket (or bentonite-fiberglass composite) that can easily resist a direct flame of up to 3500° F., which is dramatic increase from the 2000° F. that begins to degrade fiberglass itself. Using bentonite provides a number of benefits. Bentonite is naturally occurring, totally non-toxic material that can accept and bind many times its weight in water, and can be repeatedly dried and re-wetted.

Introducing a bentonite to the fiberglass carrier, serves to significantly compliment the flame resisting ability of the glass fibers by offering structural support and thermal insulation while enduring the flame. The ability of the glass to resist direct flame is not adversely affected by this compounds introduction; quite the opposite. The heat softened glass fibers are protectively enhanced. Bentonite will slow the heat conduction to the fibers which are being protected from direct flame contact.

While not wishing to be bound by theory, water content is the primary contributing factor in the efficacy of the ability of the bentonite-fiberglass fire blanket to resist flame penetration. It is the controlled moist marriage of water, glass, and bentonite that offers flame damage protection of over 3500° F. The bentonite-fiberglass blanket of the present invention remains effective as long as the bentonite is at least partially moist. If desiccation occurs, partial or whole, the ability of the bentonite-fiberglass blanket to resist direct flame is easily restored by partially or fully replacing the lost water.

Direct flame contact to a bentonite-fiberglass blanket of the present invention causes a crust to form on the blanket's surface. This is not the manifestation of the destruction of the glass fibers, but the desiccation of the bentonite under direct flame contact, thus leaving the fire blanket fully protective and functional. This crust serves to prevent the rapid evaporation of water from the area within the fiberglass that contains a reservoir of water from the previously wetted (e.g., water swollen) bentonite.

In an aspect, the present invention provides a novel fire blanket, comprising:
 a. a fiberglass blanket having first and second sides; and,
 b. bentonite;
wherein the bentonite is dispersed throughout the interstices of the fiberglass blanket.

Bentonite, which comes from weathered volcanic ash, is an absorbent aluminum phyllosilicate that comprises mostly montmorillonite clay (e.g., at least 50%). This clay displays strong colloidal properties and, when in contact with water, expands several fold its original volume by swelling. Other clay minerals may be present such as illite, cristobalite, and kaolinite as well as variable amounts of nonargillaceous detrital minerals. Bentonite is often named for the predominant metal found therein, such as potassium bentonite, calcium bentonite, sodium bentonite, and aluminum bentonite, with sodium bentonite and calcium bentonite being the predominate bentonites on the market. The numerous varieties of known bentonite will function in the presently claimed invention. Examples of bentonite include smectite clay or hectorite (e.g., Hectalite® 200 and Hectalite® GM), Volclay® bentonite (e.g., Volclay® premium gel (a sodium bentonite that is a dioctahedral smectite having the chemical formula: $(Na, Ca)_{0.33}(Al_{1.67}Mg_{0.33})Si_4O_{10}(OH)_2nH_2O$) and Volclay® KWK Food Grade), Wyoming Bentonite (e.g., Aquagel Gold Seal®, a sodium bentonite), Western Bentonite, Texas Bentonite, alumina silicate clay, and hydrated aluminum silicate.

Fiberglass as used herein also includes ceramic fibers. Fiberglass is a textile fabric made from spun ceramic fibers (e.g., alumina, zirconia, and silica). The fabric is both flexible and strong with heat-resistant properties. The fiberglass blankets used are typically woven fiberglass, such as the Durablanket® brand, which varies in thickness (e.g., ¼, ½, 1, and 2 inches). The thickness is inversely related to the water containing ability, which subsequently influences the intensity and duration of flame resistance. The density of the fiberglass can also be varied. Examples of densities include 4, 6, and 8 lbs/ft$^3$.

Fiberglass, when wet, collapses under its own weight. In addition, it can be difficult to revitalize a fully desiccated fiberglass/bentonite blanket of the present invention. It has been found that the strength of the fiberglass/bentonite blanket is substantially increased by applying a mesh fabric layer (e.g., cheesecloth) after each application of bentonite (e.g., a mesh-bentonite-fiberglass-bentonite-mesh sandwich or composite). The mesh fabric helps maintain the integrity of the blanket, specifically by holding the bentonite in contact with the fiberglass and helping the bentonite maintain the moisture necessary to prevent breakdown of the fiberglass. The mesh fabric also enhances the ability of a desiccated fiberglass/bentonite blanket to be revitalized after desiccation (i.e., absorb water).

In another aspect, the fire blanket, further comprises:
c. a 1$^{st}$ layer of mesh fabric located over the first side of the blanket and in contact with the bentonite; and,
d. a 2$^{nd}$ layer of mesh fabric located over the second side of the blanket and in contact with the bentonite.

In another aspect, the fire blanket, further comprises:
e. a 1$^{st}$ layer of bentonite in contact with the 1$^{st}$ layer of mesh fabric;
f. a 3$^{rd}$ layer of mesh fabric located over the 1$^{st}$ layer of bentonite;
g. a 2$^{nd}$ layer of bentonite in contact with the 2$^{nd}$ layer of mesh fabric;
h. a 4$^{th}$ layer of mesh fabric located over the 2$^{nd}$ layer of bentonite.

Examples of mesh fabric include cheesecloth (e.g., 50 grade cheesecloth) (e.g., 100 grade cheesecloth) and fiberglass mesh. The porosity of the mesh fabric is such that it can be partially immersed into the bentonite.

In another aspect, the mesh fabric is cheesecloth. An example of suitable cheesecloth is 50 grade cheesecloth, also called #50 or 50 weight cheesecloth. Another example of suitable cheesecloth is 100 grade cheesecloth. Further examples include 10-100 grade cheesecloth (e.g., 10, 20, 30, 40, 50, 60, 70, 80, 90, and 100).

In another aspect, the 1$^{st}$ mesh is 10-100 grade cheesecloth.

In another aspect, the 2$^{nd}$ mesh is 10-100 grade cheesecloth.

In another aspect, the 3$^{rd}$ mesh is 10-100 grade cheesecloth.

In another aspect, the 4$^{th}$ mesh is 10-100 grade cheesecloth.

In another aspect, the 1$^{st}$ mesh is 50 grade cheesecloth.
In another aspect, the 2$^{nd}$ mesh is 50 grade cheesecloth.
In another aspect, the 3$^{rd}$ mesh is 50 grade cheesecloth.
In another aspect, the 4$^{th}$ mesh is 50 grade cheesecloth.
In another aspect, the 1$^{st}$ mesh is 100 grade cheesecloth.
In another aspect, the 2$^{nd}$ mesh is 100 grade cheesecloth.
In another aspect, the 3$^{rd}$ mesh is 100 grade cheesecloth.
In another aspect, the 4$^{th}$ mesh is 100 grade cheesecloth.
In another aspect, mesh fabric is fiberglass mesh.
In another aspect, the fire blanket further comprises:
i. water, wherein the water is absorbed by the bentonite.

Typically the water is absorbed by the bentonite such that the bentonite is at least moist Moist means that the bentonite is at least visibly wet (e.g., the bentonite appears slightly darken than dry bentonite or moisture can be seen on the surface of the bentonite-fiberglass blanket).

In another aspect, the bentonite is fully saturated with water.

Fully saturated means that the bentonite has absorbed the same amount of water as if it had been immersed in water for a few minutes. This can be achieved by any technique that will contact water with the bentonite in the blanket. Such techniques include immersing the bentonite-fiberglass blanket in water or spraying both sides of the blanket with water. The fire blankets of the present invention will adhere to surfaces, e.g., pipes, drywall, wood, etc., particularly when fully saturated with water though a less than fully saturated blanket will still adhere to surfaces.

Bentonite can absorb up to about 10 times its weight of water. Thus, examples of the amount of water present in the bentonite/water mixture include (a) from 50-90%, (b) from 60-80%, and (c) from 65-75% by weight of the mixture. Additional examples include from 50, 51, 52, 53, 54, 55, 56, 57, 58, 59, 60, 61, 62, 63, 64, 65, 66, 67, 68, 69, 70, 71, 72, 73, 74, 75, 76, 7, 78, 79, 80, 81, 82, 83, 84, 85, 86, 87, 88, 89, to 90% by weight of the mixture.

In another aspect of the present invention, the fully saturated fire blanket weighs about 11.25 ounces/square foot when ¼" fiberglass is used (e.g., ~2.75 ounces/sq ft fiberglass and ~6.5 ounces/sq ft bentonite/water). This translates into a 25 square foot fire blanket weighing about 17.5 lbs when activated with water. When desiccated, the fiberglass/bentonite blanket weighs about 4.5 ounces/square foot when ¼" fiberglass is used. This translates into a 25 square foot fire blanket weighing about 11.25 pounds.

The amount of bentonite present in the fire blanket can vary depending on its use. Examples of the amount of bentonite present in a desiccated bentonite/fiberglass blanket include (a) from 10-50%, (b) from 20-45%, (c) from 30-45%, (d) from 35-45%, and (e) about 40% by weight. Additional examples include 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 41, 42, 43, 44, 45, 46, 47, 48, 49, to 50% by weight of bentonite when desiccated.

Examples of the amount of bentonite/water present in a wet (e.g., activated) bentonite/fiberglass blanket include (a) from 20-70%, (b) from 30-65%, (c) from 40-65%, (d) from 50-60%, and (e) about 58% by weight. Additional examples include 20, 21, 22, 23, 24, 25, 26, 27, 28, 29, 30, 31, 32, 33, 34, 35, 36, 37, 38, 39, 40, 41, 41, 42, 43, 44, 45, 46, 47, 48, 49, 50, 51, 52, 53, 54, 55, 56, 57, 58, 59, 60, 61, 62, 63, 64, 65, 66, 67, 68, 69, to 70% by weight of bentonite/water.

Once the bentonite-fiberglass blanket of the present invention is formed and the bentonite wetted, the blanket manifests an ability to adhere to any surface, at any angle. This ability to adhere eliminates the necessity of grommets, pins, tape, etc. Upon positioning, the blanket will secure any object between it and the wall under its protection from flame damage. The cohesiveness of the blanket does not significantly diminish with use. This feature can be easily revitalized with a slight water spray if the blanket begins to dry. The blanket also leaves little to no residue upon removal.

In another aspect, the fire blanket is desiccated.

Examples of desiccated include the weight of bentonite present is at least 75% bentonite (the remainder being water). Other examples include at least 76, 77, 78, 79, 80, 81, 82, 83, 84, 85, 86, 87, 88, 89, 90, 91, 92, 93, 94, 95, 96, 97, 98, 99, to 100% by weight bentonite (the remainder being water).

The bentonite-fiberglass blanket of the present invention is fire retardant only when the bentonite, which has an affinity for water, is saturated. In the event the blanket has desiccated, in whole or in part, full function is easily restored via a spray of water (e.g., from a spray bottle or hose).

Solder Blanket. In another aspect, the fire blanket of the present invention is a solder blanket. For this purpose, the thickness of the starting fiberglass is ¼ inch, though a larger thickness can be used if desired. A benefit of the present invention is that the bentonite-fiberglass solder blanket, when wetted and ready for use, will adhere firmly to the surface it is protecting, thereby making it easy to use in confined repair areas. The safety of the repair procedure is enhanced by not having otherwise air space behind the blanket which, being a more intensely heated area, could harbor a difficult to observe fire. The solder blanket can be cut to size and wrapped about pipes, wires, previously soldered pipe joints, etc. to prevent them from being heated by a nearby flame. Multiple solder blankets can be used at the same time. They can be overlapped to provide additional protection or to protect shapes that are difficult to cover with one blanket. In addition, the solder blankets can be stacked if a first blanket is beginning to dry due to a long period of exposure to heat or flame.

In another aspect, the solder blanket is contained within a resealable package (e.g., a plastic bag with a resealable closure on one side). In another aspect, the solder blanket contained within the resealable package is sufficiently wet to be used without contacting with water. In another aspect, the solder blanket contained within the resealable package is too dry to be used without contacting with water. The solder blanket can be stored wet or dry, though wet storage allows for one (e.g., a plumber) to remove and immediately use the solder blanket without have to wet it.

In another aspect, the present invention provides a novel solder blanket kit, comprising:
  a. a fire blanket of the present invention;
  b. water, wherein the water is absorbed into the bentonite of the fire blanket; and,
  c. a water impermeable pouch enclosing the blanket, and water.

The water impermeable pouch can be an envelope or a plastic bag (or plastic container), or any other material that is water impermeable.

In another aspect, kit, further comprises: water that is not absorbed into the bentonite. In this aspect, there is enough water present in the pouch such that the bentonite is fully saturated and water remains (e.g., is visibly and tactically present) in the pouch.

Examples of sizes of a solder blanket include from 6, 7, 8, 9, 10, 11, 12, 13, 14, 15, 16, 17, 18, 19, 20, 21, 22, 23, 24 inches on a first edge and from 6, 7, 8, 9, 10, 11, 12, 13, 14, 15, 16, 17, 18, 19, 20, 21, 22, 23, 24 inches on a second edge (e.g., perpendicular to the first to make a square or rectangular blanket). Additional examples include (a) 4"×8", (b) 5"×8", (c) 6"×8", (d) 7"×8", (e) 8"×8", (f) 6"×10", (g) 8"×10", and (h) 12"×12". While the solder blanket could be 1, 1.5, 2, 2.5, 3, 3.5, to 4' on a side, these blankets are typically 1' or smaller per side.

Fire Blanket. In another aspect, the fire blanket of the present invention is a fire blanket. For this purpose, the thickness of the starting fiberglass is ¼ inch, though larger thickness can be used if desired. This is the type of blanket that is typically required to be present in commercial kitchens, schools, on boats, on fire trucks, etc. In another aspect, the fire blanket is stored sufficiently wet to be used without contacting with water. In another aspect, the fire blanket is stored too dry to be used without contacting with water. While the fire blanket can be stored wet or dry, the fire blanket is larger than a solder blanket and much heavier when wet. Thus dry storage (e.g., a moisture level from below saturation all the way to nearly full or full desiccation) would allow for easier handling as the dry fire blanket will be much lighter. The fire blanket, if not sufficiently wet to be used, can be instantly wetted (e.g., spray with hose or spray bottle) prior to use.

In another aspect, the fire blanket is stored by folding when slightly moist to fully saturated and placing into a cabinet (e.g., a wall mounted cabinet), a locker (e.g., an upright locker similar to a gym locker or a foot locker), or into an easily transported soft container (e.g., a backpack or a bag with handles).

In another aspect, the fire blanket is used to protect the glass and/or outside of a fire truck. When a fire truck is trapped and the firefighters are about to be engulfed in flames, the firefighters will often, as a last resort, seek refuge inside the truck where a sprinkler system is present. Unfortunately, the sprinklers will run out of water and the windows of the fire truck will shatter due to the heat of the fire. A fire blanket of the present invention can be applied to the outside of the windows (e.g., fire blanket curtains or a fire truck blanket) to protect them from the heat and thereby protect the firefighters inside the truck. The firefighters themselves can also use a blanket or blankets inside the truck to protect themselves from the heat of the approaching fire.

The size of the fire blanket will vary widely based on the size of the kitchen (or room or building or fire truck) and the fire prevention steps required to be or being taken. Examples of sizes of a fire blanket include from 1, 1.5, 2, 2.5, 3, 3.5, 4, 4.5, 5, 5.5, 6, 6.5, 7, 7.5, 8, 8.5, 9, 9.5, to 10 feet on a first edge and from 1, 1.5, 2, 2.5, 3, 3.5, 4, 4.5, 5, 5.5, 6, 6.5, 7, 7.5, 8, 8.5, 9, 9.5, to 10 feet on a second edge (e.g., perpendicular to the first to make a square or rectangular blanket). If the blanket is intended to protect the outside of a building, it can be sized even larger to meet the needs of the building, e.g., 10, 20, 30, 40, to 50' or more on a side.

Fire Shelter. This is the type of blanket that is used by firemen as a last resort, when no escape route is available. The firemen will select a spot as far from surrounding adversity (e.g., flames, smoke, etc.), remove a fire shelter (e.g., a Mylar® sheet) from a carrying pouch, and craw underneath the fire shelter with the hopes of being protected from the fire. The typical fire shelter, designed most specifically to capture air (e.g., a Mylar® sheet) easily will be destroyed if directly contacted with flames.

Thus, in another aspect, the fire blanket of the present invention is a fire shelter. For this purpose, the thickness of the starting fiberglass is ¼ inch, though larger thickness can be used if desired. The fire shelter comprises a blanket of the present invention that is large enough to cover at least one fireman, if not more. Examples of the size of the blanket to be used as a fire shelter include from 4, 4.5, 5, 5.5, 6, 6.5, 7, 7.5, 8, 8.5, 9, 9.5, to 10 feet on a first edge and from 4, 4.5, 5, 5.5, 6, 6.5, 7, 7.5, 8, 8.5, 9, 9.5, to 10 feet on a second edge (e.g., perpendicular to the first to make a square or rectangular blanket). The fire shelter can be stored desiccated to reduce its weight. The fire shelter is then activated by the application of water to it.

In another aspect, the present invention provides a novel method of making a fire blanket of the present invention, comprising:
  a. wetting a fiberglass blanket, the blanket having $1^{st}$ and $2^{nd}$ sides b. applying a first bentonite water mixture to the 1$^{st}$ and 2$^{nd}$ sides of the blanket.

In another aspect, the present invention provides a novel method of making a fire blanket of the present invention, comprising:
  a. wetting a fiberglass blanket, the blanket having 1$^{st}$ and 2$^{nd}$ sides;
  b. applying a 1$^{st}$ bentonite/water mixture (e.g., 1 part bentonite to 3 parts water, by weight) to the 1$^{st}$ side of the blanket;
  c. applying a 1$^{st}$ layer of a mesh fabric to the outside of the 1$^{st}$ layer of the 1$^{st}$ bentonite/water mixture to form a mesh/bentonite/fiberglass composite.

Examples of bentonite/water mixture include 1:2 bentonite/water, 1:3 bentonite/water, and 1:4 bentonite/water parts by weight. The thinner bentonite water mixtures (e.g., 1:3 and 1:4) are used when applying directly to the fiberglass to aid in flowing the bentonite into the interstices of the fiberglass. Thicker bentonite/water mixtures (e.g., 1:2) can be used on the outer layers where flowing is not as important.

The applying (e.g., smearing, slathering, spreading, etc.) of the bentonite/water mixture can be followed by mechanically pressing or mechanically vibrating the bentonite into the interstices of glass fibers. Vibrating the bentonite can aid its entry into the interstices of the fiberglass.

In another aspect, the applied 1$^{st}$ bentonite/water mixture is then mechanically vibrated into the matrix of the fiberglass.

In another aspect, the method further comprises:
  d. applying a 2$^{nd}$ bentonite/water mixture (e.g., 1 part bentonite to 3 parts water, by weight) to the 2$^{nd}$ side of the blanket;
  e. applying a 2$^{nd}$ layer of a mesh fabric to the outside of the 2$^{nd}$ layer of the 2$^{nd}$ bentonite/water mixture to form a mesh/bentonite/fiberglass/bentonite/mesh composite.

In another aspect, the applied 2$^{nd}$ bentonite/water mixture is then mechanically vibrated into the matrix of the fiberglass.

Examples of the thickness of the 1$^{st}$ and 2$^{nd}$ layers of bentonite-water include about ⅛ inch and about ¼ inch.

In another aspect, the method further comprises:
  f. applying a 3$^{rd}$ bentonite/water mixture (e.g., 1 part bentonite to 2 parts water, by weight) to the 1$^{st}$ side of the blanket;
  g. applying a 3$^{rd}$ layer of a mesh fabric to the outside of the 3$^{rd}$ layer of the bentonite/water mixture to form a mesh/bentonite/mesh/bentonite/fiberglass/bentonite/mesh composite.

As with the 1$^{st}$ and 2$^{nd}$ bentonite/water mixtures, the 3$^{rd}$ and 4$^{th}$ mixtures can be mechanically applied (e.g., pressed) into the blanket. These additional layers can also be vibrated into the composite.

In another aspect, the method further comprises:
  h. applying a 4$^{th}$ bentonite/water mixture (e.g., 1 part bentonite to 2 parts water, by weight) to the 2$^{nd}$ side of the blanket;
  i. applying a 4$^{th}$ layer of a mesh fabric to the outside of the 4$^{th}$ layer of the bentonite/water mixture to form a mesh/bentonite/mesh/bentonite/fiberglass/bentonite/mesh/bentonite/mesh composite.

Examples of the thickness of the 3$^{rd}$ and 4$^{th}$ layers of bentonite-water include about ⅛ inch and about ¼ inch.

In another aspect, the applied 3$^{rd}$ bentonite/water mixture is then mechanically vibrated into the matrix of the fiberglass.

In another aspect, the applied 4$^{th}$ bentonite/water mixture is then mechanically vibrated into the matrix of the fiberglass.

The layers of mesh fabric (e.g., cheesecloth) provide additional strength to the blanket. In addition, the presence of the mesh fabric allows for greater water concentration that then provides a water reservoir to increase the efficacy of the fire blanket when under flame pressure.

In another aspect, the mesh fabric is cheesecloth (e.g., 50 grade cheesecloth) (e.g., 100 grade cheesecloth).

In another aspect, the 1$^{st}$ mesh is 10-100 grade cheesecloth.

In another aspect, the 2$^{nd}$ mesh is 10-100 grade cheesecloth.

In another aspect, the 3$^{rd}$ mesh is 10-100 grade cheesecloth.

In another aspect, the 4$^{th}$ mesh is 10-100 grade cheesecloth.

In another aspect, the 1$^{st}$ mesh is 50 grade cheesecloth.
In another aspect, the 2$^{nd}$ mesh is 50 grade cheesecloth.
In another aspect, the 3$^{rd}$ mesh is 50 grade cheesecloth.
In another aspect, the 4$^{th}$ mesh is 50 grade cheesecloth.
In another aspect, the 1$^{st}$ mesh is 100 grade cheesecloth.
In another aspect, the 2$^{nd}$ mesh is 100 grade cheesecloth.
In another aspect, the 3$^{rd}$ mesh is 100 grade cheesecloth.
In another aspect, the 4$^{th}$ mesh is 100 grade cheesecloth.
In another aspect, the mesh is fiberglass mesh.

The 3$^{rd}$ and 4$^{th}$ layers of mesh fabric also provide additional strength to the blanket.

The integrity of the mesh fabric is protected from potential flame damage upon being covered over by bentonite.

Once the blanket is formed, it is easily handled, can be cut to the desired shape and size, and can be used individually or overlapped in tandem to cover a wider area.

In another aspect, the method of making a fire blanket, further comprises: desiccating the bentonite-fiberglass composite. Desiccating reduces the weight of the blanket making it easier to fold, store, and transport. A desiccated blanket can be activated for fire retarding by wetting the bentonite (e.g., the bentonite can be saturated by spraying with water from a bottle, faucet, or hose).

In another aspect, the method of making a fire blanket, further comprises: contacting a desiccated (or partially dried) bentonite-fiberglass composite with sufficient water to hydrate the bentonite. The water activates the fire retardant qualities of the blanket.

In another aspect, the present invention provides a novel method of protecting munitions (ordinance) from direct flame, comprising: covering the munitions with at least one fire blanket of the present invention. In another aspect, the munitions are covered by two or more blankets. The blankets covering the munitions can be inactivated (e.g., dry or dessicated) or activativated (e.g., at least most or fully saturate). The munitions blankets if inactivated can be activated by soaking them with water (e.g., spraying from a hose).

In another aspect, the present invention provides a novel method protecting a home (or similar structure), comprising: applying a fire blanket (e.g., a 10×10 ft$^2$ blanket) to the outside surface of the home, including the windows and also propane tanks (or other gas tanks that might be exposed to a fire). More than one blanket can be used by overlapping the blankets. The blankets can be affixed (e.g., using staples or roofing nails) to the home to prevent them from being blown off. Typically dry or desiccated blankets would be applied, which would then be activated by applying water. It is expected that the wet blankets will adhere to the surface of the house due to the inherent adhesive properties of wet bentonite. The dry blankets are much lighter than the wet blankets. For example, a 100 square foot blanket could weigh about 20 lbs dry, but over 40 lbs wet.

The present invention may be embodied in other specific forms without departing from the spirit or essential attributes thereof. This invention encompasses all combinations of preferred aspects of the invention noted herein. It is understood that any and all embodiments of the present invention may be taken in conjunction with any other embodiment or embodiments to describe additional more preferred embodiments. It is also to be understood that each individual element of the preferred embodiments is intended to be taken individually as its own independent preferred embodiment. Furthermore, any element of an embodiment is meant to be combined with any and all other elements from any embodiment to describe an additional embodiment.

The examples provided in the definitions present in this application are non-inclusive unless otherwise stated. They include but are not limited to the recited examples.

EXAMPLE 1

Solder Blanket

A solder blanket was made using the following procedure.

a. A fiberglass blanket, 2'×2', ¼" thick, 8 lbs/ft$^3$ (e.g., Durablanket S® by Unifrax) was soaked by water then allowed to drain.
b. The blanket was placed on a flat surface.
c. A mixture of 1 lb bentonite and 3 lb water was smeared to about a ⅛" thickness across the top side of the blanket.
d. 50 grade cheesecloth was stretched across the wet bentonite and pushed into the surface of the wet bentonite.
e. A mechanical vibrator was applied to the cheesecloth/wet bentonite to force the bentonite into the interstices of the fiberglass to produce a cheesecloth/bentonite/fiberglass composite wherein the cheesecloth was submerged into the surface of the bentonite.
f. The blanket was flipped over and the procedure repeated to produce a cheesecloth/bentonite/fiberglass/bentonite/cheesecloth composite suitable for use as a solder blanket.

EXAMPLE 1A

Solder Blanket

A solder blanket was made using the following procedure.

a. A fiberglass blanket, 2'×2', ¼" thick, 8 lbs/ft$^3$ (e.g., Durablanket S® by Unifrax) is soaked by water then allowed to drain.
b. The blanket is placed on a flat surface.
c. A mixture of 1 lb bentonite and 3 lb water is smeared to about a ⅛" thickness across the top side of the blanket.
d. 100 grade cheesecloth is stretched across the wet bentonite and pushed into the surface of the wet bentonite.
e. A mechanical vibrator is applied to the cheesecloth/wet bentonite to force the bentonite into the interstices of the fiberglass to produce a cheesecloth/bentonite/fiberglass composite wherein the cheesecloth is submerged into the surface of the bentonite.
f. The blanket is flipped over and the procedure repeated to produce a cheesecloth/bentonite/fiberglass/bentonite/cheesecloth composite suitable for use as a solder blanket.

EXAMPLE 2

Welding Blanket

A solder blanket can be made using the following procedure.

a. A fiberglass blanket, 2'×2', ½" thick, 8 lbs/ft$^3$ (e.g., Durablanket S® by Unifrax) is soaked by water then allowed to drain.
b. The blanket is placed on a flat surface.
c. A mixture of 1 lb bentonite and 3 lb water is smeared to about a ⅛" thickness across the top side of the blanket.
d. 50 grade cheesecloth is stretched across the wet bentonite and pushed into the surface of the wet bentonite.
e. A mechanical vibrator is applied to the cheesecloth/wet bentonite to force the bentonite into the interstices of the fiberglass to produce a cheesecloth/bentonite/fiberglass composite wherein the cheesecloth is submerged into the surface of the bentonite.
f. The blanket is flipped over and the procedure repeated to produce a cheesecloth/bentonite/fiberglass/bentonite/cheesecloth composite.
g. A mixture of 1 lb bentonite and 2 lb water is smeared to about a ⅛" thickness across the top side of the resulting composite.
h. 50 grade cheesecloth is stretched across the wet bentonite and pushed into the surface of the wet bentonite.
i. A mechanical vibrator is applied to the cheesecloth/wet bentonite to produce a cheesecloth/bentonite/cheesecloth/bentonite/fiberglass/bentonite/cheesecloth composite wherein the second layer of cheesecloth is submerged into the surface of the bentonite.
j. The blanket is flipped over and the procedure repeated to produce a cheesecloth/bentonite/cheesecloth/bentonite/fiberglass/bentonite/cheesecloth/bentonite/cheesecloth composite that is suitable for use as a welding blanket.

EXAMPLE 2A

Welding Blanket

A solder blanket can be made using the following procedure.

a. A fiberglass blanket, 2'×2', ½" thick, 8 lbs/ft$^3$ (e.g., Durablanket S® by Unifrax) is soaked by water then allowed to drain.
b. The blanket is placed on a flat surface.
c. A mixture of 1 lb bentonite and 3 lb water is smeared to about a ⅛" thickness across the top side of the blanket.
d. 100 grade cheesecloth is stretched across the wet bentonite and pushed into the surface of the wet bentonite.
e. A mechanical vibrator is applied to the cheesecloth/wet bentonite to force the bentonite into the interstices of the fiberglass to produce a cheesecloth/bentonite/fiberglass composite wherein the cheesecloth is submerged into the surface of the bentonite.
f. The blanket is flipped over and the procedure repeated to produce a cheesecloth/bentonite/fiberglass/bentonite/cheesecloth composite.

g. A mixture of 1 lb bentonite and 2 lb water is smeared to about a ⅛" thickness across the top side of the resulting composite.

h. 100 grade cheesecloth is stretched across the wet bentonite and pushed into the surface of the wet bentonite.

i. A mechanical vibrator is applied to the cheesecloth/wet bentonite to produce a cheesecloth/bentonite/cheesecloth/bentonite/fiberglass/bentonite/cheesecloth composite wherein the second layer of cheesecloth is submerged into the surface of the bentonite.

j. The blanket is flipped over and the procedure repeated to produce a cheesecloth/bentonite/cheesecloth/bentonite/fiberglass/bentonite/cheesecloth/bentonite/cheesecloth composite that is suitable for use as a welding blanket.

Numerous modifications and variations of the present invention are possible in light of the above teachings. It is therefore to be understood that within the scope of the appended claims, the invention may be practiced otherwise that as specifically described herein.

What is claimed is:

1. A fire blanket comprising:
   a. a fiberglass blanket having first and second sides;
   b. a bentonite;
   c. a $1^{st}$ layer of a mesh fabric located over the first side of the blanket and in contact with the bentonite; and,
   d. a $2^{nd}$ layer of a mesh fabric located over the second side of the blanket and in contact with the bentonite;
   wherein the bentonite is dispersed throughout the interstices of the fiberglass blanket.

2. The fire blanket of claim 1, wherein the mesh fabric is 10-100 grade cheesecloth.

3. The fire blanket of claim 1, wherein the mesh fabric is 50 grade cheesecloth.

4. The fire blanket of claim 1, wherein the mesh fabric is fiberglass mesh.

5. The fire blanket of claim 1, further comprising:
   e. a $1^{st}$ layer of bentonite in contact with the $1^{st}$ layer of a mesh fabric;
   f. a $3^{rd}$ layer of a mesh fabric located over the $1^{st}$ layer of bentonite;
   g. a $2^{nd}$ layer of bentonite in contact with the $2^{nd}$ layer of a mesh fabric;
   h. a $4^{th}$ layer of a mesh fabric located over the $2^{nd}$ layer of bentonite.

6. The fire blanket of claim 5, wherein the mesh fabric is 10-100 grade cheesecloth.

7. The fire blanket of claim 5, wherein the mesh fabric is 50 grade cheesecloth.

8. The fire blanket of claim 5, wherein the mesh fabric is 100 grade cheesecloth.

9. The fire blanket of claim 5, wherein the mesh fabric is fiberglass mesh.

10. The fire blanket of claim 1, further comprising:
    i. water, wherein the water is absorbed by the bentonite.

11. The fire blanket of claim 10, wherein the bentonite is fully saturated with water.

12. The fire blanket of claim 10, wherein the amount of bentonite and water present is from 20-70% by weight.

13. The fire blanket of claim 1, wherein the amount of bentonite present is from 10-50% by weight.

* * * * *